United States Patent [19]

Rieger et al.

[11] Patent Number: 4,528,099

[45] Date of Patent: Jul. 9, 1985

[54] FILTER MEDIUM FOR FILTERING MOLTEN METALS

[75] Inventors: Wolfhart Rieger, Buch; Lugwig Gauckler, Schaffhausen; Konrad Kampfer; Albert Mauer, both of Thayngen; Marco Dellapina, Uhwiesen; Volker Nobbe, Dachsen, all of Switzerland

[73] Assignee: Swiss Aluminium Ltd., Chippis, Switzerland

[21] Appl. No.: 501,381

[22] Filed: Jun. 6, 1983

[30] Foreign Application Priority Data

Jun. 10, 1982 [CH] Switzerland ............ 3586/82

[51] Int. Cl.³ .................................... C04B 21/00
[52] U.S. Cl. ............................ 210/489; 210/500.1; 210/510.1
[58] Field of Search ............ 210/773, 774, 767, 488, 210/489, 490, 510.1, 503, 504, 500.1, 184, 185; 75/89, 93 R

[56] References Cited

U.S. PATENT DOCUMENTS

| | | | |
|---|---|---|---|
| 3,281,238 | 10/1966 | Bachowski et al. | 210/773 |
| 3,524,548 | 8/1970 | McDonald et al. | 210/153 |
| 3,893,917 | 7/1975 | Pryor et al. | 75/68 R |
| 4,278,544 | 7/1981 | Takashima | 210/510.1 |
| 4,287,098 | 9/1981 | Farnworth et al. | 502/344 |
| 4,334,990 | 6/1982 | du Manoir de Juaye et al. | 210/510.1 |
| 4,343,704 | 8/1982 | Brockmeyer | 210/510.1 |
| 4,381,998 | 5/1983 | Roberts et al. | 210/510.1 |
| 4,395,333 | 7/1983 | Groteke | 210/510.1 |
| 4,426,287 | 1/1984 | Narumiya | 210/446 |

Primary Examiner—Richard V. Fisher
Assistant Examiner—Wanda L. Millard
Attorney, Agent, or Firm—Bachman and LaPointe

[57] ABSTRACT

Filter medium in the form of a stable body made of ceramic material and employed for filtering molten metals. The filter medium is made up of at least two effective filter layers such that a relatively thick layer of large pore diameter lies on a relatively thin layer of small pore diameter. This arrangement aims at attaining the maximum possible wetting of the interior of the filter medium.

9 Claims, 2 Drawing Figures

FILTER MEDIUM FOR FILTERING MOLTEN METALS

BACKGROUND OF THE INVENTION

The invention relates to a filter medium in the form of a stable body which is made of ceramic material and is employed for filtering molten metals.

Revealed in the U.S. Pat. No. 3,524,548 is a solid porous filter for filtering molten aluminum; that filter is made of a baked granular-like refractory material which is not attacked by molten aluminum, and features a glassy type of binding agent containing not more than 10% silica.

The granulate material mentioned is "fused alumina" or "tabular alumina", e.g. a crushed corundum produced from a melt. The use of this material results in a filter of relatively low permeability and porosity. The effectiveness and filtering capacity of the filter is limited by the inner structure, for which reason in practice bundles of filter pipes are employed to achieve the desired throughput flow rate.

At the start and during filtration relatively large pressure differences are required in order for the aluminum to pass through the filter element.

By making use of a quite different type of filter element attempts have been made to eliminate such disadvantages as limited filtering capacity and large pressure differences. The U.S. Pat. No. 3,893,917 describes a filter element which is manufactured by impregnating a polyurethane foam with a ceramic suspension, expressing the excess suspension, drying and baking. With this method an exact reproduction of the structure of the original foam is obtained in solid ceramic form. Filter elements of this kind exhibit a high filter capacity and high throughput rate which permits them to be used in the form of simple filter plates. These filter elements suffer from the disadvantage that they are relatively expensive to produce. Also, they are relatively poorly wet inside by the molten metal passing through them.

Proposed is the manufacture of filter media wherein mainly spherical, refractory material, for example hollow corundum spheres are bonded together by sintering or by means of a chemical bond which can withstand high temperatures to form a solid porous body; also proposed is the use of these bodies for filtering molten metals.

If such a filter is employed for filtering molten metal, an excessive resistance to flow through the filter at the start can lead to an undesired, large difference in level between the run-in and run-out sides of the filter.

If the permeability of the filter is increased, for example by increasing the porosity, then the resistance to initial flow decreases; in general, however, the pore diameter, which essentially determines the effectiveness of filtration, is also increased resulting in less effective filtration.

As a rule all these known filter elements exhibit a tendency for poor wetting in the interior. As a result the rate of throughput is markedly reduced and the filtering capacity of the filter medium is not fully exploited.

The object of the present invention is to overcome the above mentioned disadvantages and to make available a filter medium which, as a result of as complete as possible wetting in the interior, exhibits as low as possible initial and filtering resistance at as high as possible filtering efficiency, throughput rates and filtering capacity.

SUMMARY OF THE INVENTION

The foregoing object is achieved by way of the present invention wherein a filter medium is made up of at least two filtering layers, the layers being arranged one after the other in the direction of filtration, wherein layer A has a thickness $d_A$ of 9-91 mm, porosity $f_A$ of 0.25-0.8 and pore diameter $\lambda_A$ of 0.5-2 mm, the parameter $H_{SA}$ of layer A which is proportional to the filtering resistance of layer A and is equal to $$\frac{d_A}{\lambda_A^2 f_A}$$

having values of 28-14,560 cm$^{-1}$, and layer B has a thickness $d_B$ of 1-33 mm, porosity $f_B$ of 0.25-0.5 and pore diameter $\lambda_B$ of 0.2-1 mm, the parameter $H_{SB}$ of layer B which is proportional to the filtering resistance of layer B and is equal to $$\frac{d_B}{\lambda_B^2 f_B}$$

having values of 20-33,000 cm$^{-1}$, and wherein the ratio of thickness $d_A$ to thickness $d_B$ lies between 9:1 and 3:1, and the ratio of the numerical values of parameters $H_{SA}$ and $H_{SB}$ lies between 1:1.2 and 1:30.

The relationship between the values $d_A$, $f_A$ and $\lambda_A$ representing parameter $H_{SA}$, and likewise between $d_B$, $f_B$ and $\lambda_B$ representing parameter $H_{SB}$ is as follows:

$$\frac{d}{\lambda^2 f}$$

which is proportional to the resistance to filtering and hence the pressure difference or difference in levels due to any one of the layers of filter between the inlet and outlet inside a filtering device. The total difference in pressure or level is proportional to the sum of the pressure or level differences at the individual filter layers.

DETAILED DESCRIPTION

Figure 1:
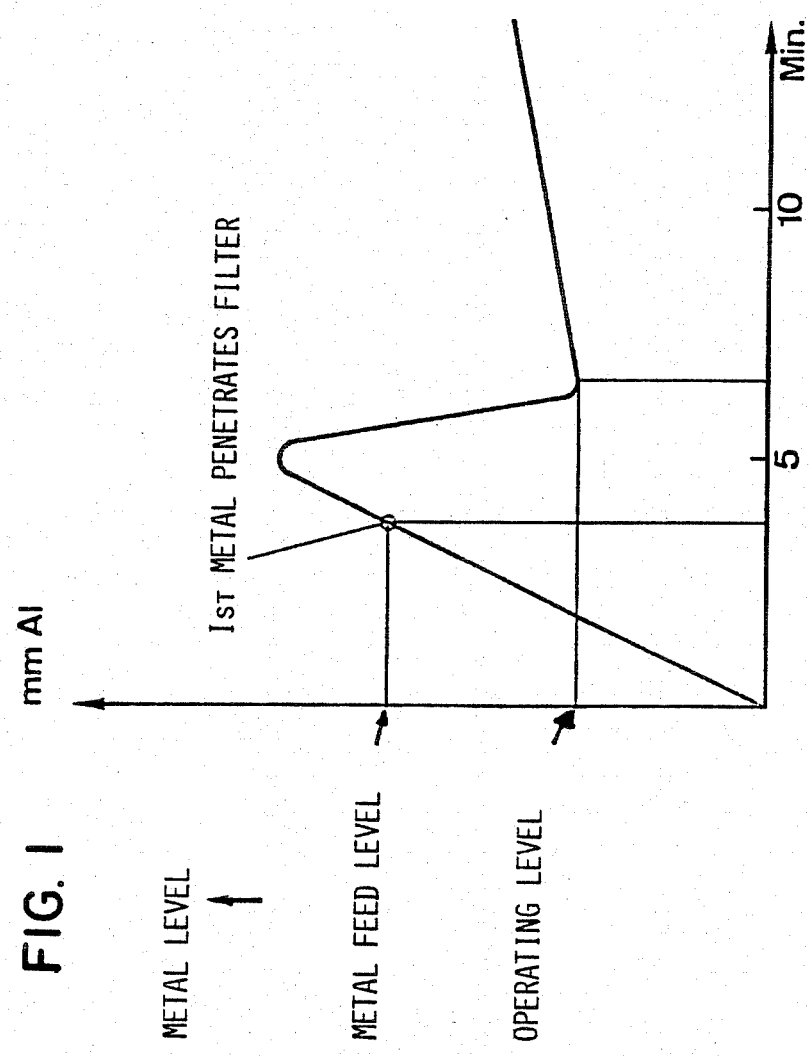
FIG. 1 is a graph illustrating the change in metal level as a function of time for Example No. 1.

The filter medium of the invention features a relatively thick layer A with a large pore diameter and a—in relation to layer A—thin layer B with a small pore diameter.

The pore diameters are determined by the choice of particle size. However, by means of substances which increase the porosity, or via appropriate measures, the pore diameter can be adjusted on a larger scale than would be the case according to the rules of packing spherical bodies.

The porosity provides a measure of the total volume of space for flow between the spheres, expressed with respect to the total volume of a filter body. The space for flow of liquid metal is only that space between the outer surface of the spheres and not any space which may be present in the spheres themselves.

Usefully layer A is positioned prior to layer B i.e. upstream of layer B.

Layers A and B can be of refractory material in the form of spherical and/or hollow spherical grains which are strongly bonded together.

Used in layer A are preferably hollow corundum spheres of minimum diameter 1 mm and maximum diameter 5 mm.

Likewise in layer B use is made preferably of hollow corundum spheres, in this case of minimum diameter 0.3 mm and maximum diameter 2 mm.

Usefully a narrow range of hollow corundum grain sizes is employed and such that the minimum grain diameter in a range of particle sizes is more than 65% of the diameter of the largest grains in that range.

For example particle size ranges for layer A are 1–1.4 mm, 1.4–1.8 mm, 1.8–2.5 mm, 2.5–3.2 mm, 3.2–4 mm or 4–5 mm.

Particle size ranges employed for layer B are for example from 0.3–0.5 mm, 0.5–0.7 mm, 0.7–1 mm, 1–1.4 mm, 1.4–2.0 mm.

The average size of particle in layer A should thus always be greater than the average size of particle in the neighboring layer B.

The grains of refractory material preferably exhibit a spherical shape or approximately spherical shape. The use of lens-shaped or droplet-shaped grains also lies within the scope of the invention. Depending on the method employed to manufacture such grains, mixtures of various external shape can be obtained. The grains can be in solid or preferably hollow form, the refractory material in the latter case only forms an outer shell; however grains made up of concentric shell like layers or a plurality of open or closed cells delimited outside by a shell can also be employed.

These various kinds of grain, e.g. solid or hollow grains, can be mixed in any desired ratios. Ceramic materials known to the expert can be employed. The choice is dictated mainly according to the requirements made of the filter by the material to be filtered, in particular in terms of chemical stability, thermal resistance, strength, service life, shaping properties and wettability.

Some of the materials for use are metallic oxides such as aluminum oxides for example corundum, boehmite, gibbsite, bauxite, $SiO_2$ e.g. perlite, silicates such as mullite, aeromullite, silimanite or fire clay, then magnesium oxides and magnesium silicates such as steatite, forsterite, enstatite and cordierite, also dolomite and mixtures of these oxides.

Further metallic oxides for consideration, include zirconium oxide, stabilized or unstabilized in monoclinic, tetragonal and/or cubic form; tin oxide doped or non-doped; aluminum titanate, calcium silicates, calcium magnesium silicates, magnesium aluminum silicates, zirconium silicates, calcium aluminates, iron-chromium oxides, aluminum hydroxides, high melting point glasses and all spinels and perowskite. Included in refractory materials for the present case are also coals, in particular in the form of graphite, coke or pitch and mixtures thereof, also the non-oxide compounds boron carbide, titanium carbide, titanium diboride and zirconium diboride, silicon carbide, silicon nitride and its solid solutions.

Usefully, the grains of refractory materials contain aluminum oxides, preferably in the form of corundum and/or bauxite as well as zirconium oxide or spinels.

Mixtures of various individual components present in various concentrations can likewise be employed.

Spherical shaped refractory material is produced in a conventional manner. As a rule spherical grains are obtained by roll-granulation, spray-granulation or by spraying and then sintering.

The production of hollow spheres is likewise known.

A stream of fluid, for example of corundum, can be sprayed using compressed air or steam, as a result of which hollow spheres up to 5 mm in diameter are obtained.

One can, however, also employ a process making use of a suspension for example containing finely divided high melting point oxides and substances which release carbon dioxide or else hydrogen peroxide as propellant. The suspension is then dispersed by mechanical means, usefully by dripping and/or by jetting and the resultant droplets dried and baked.

Similarly, spherical grains can be obtained via the well known sol-gel process.

By appropriate choice and adaptation the layers according to the invention and exhibiting the values according to the invention can also be produced using crushed particulate corundum prepared from the melt. For the reasons mentioned at the start, however, a spherical material is preferred.

Bonding the particles together can be carried out in a variety of ways. The grains can be bonded together by means of another phase of a chemical nature; for this one can consider phosphates such as aluminum orthophosphate, phosphoric acid, magnesium ortho-borate, aluminum hydroxychloride and/or silica gel.

The grains can also be bonded by means of glasses, for example silica or boron based glasses and/or by means of a finely divided substance which is deposited on the surface and corresponds in composition to that of the refractory material in question. An example of the last mentioned concerns corundum spheres which were coated or mixed with a finely divided amorphous aluminum oxide powder in the angstrom range. The finely divided powder sinters at low temperatures as coarse grained powder and is able thus to form a homogeneous, solid and highly refractory body.

When employing glasses the amount of glass for bonding should be up to 60 wt. % of the final filter medium. Usefully the amount of glass amounts to 20–60 wt. %, preferably 20–40 wt. %, of the filter medium. By appropriate choice of grains and ceramic bonding material a homogeneous body can also be obtained by producing a mutual reaction between the binder and the refractory material as a result of which a new, highly refractory material and likewise highly refractory bond is created.

It is also possible to bond the grains together without addition of another phase; in that case the grains are simply sintered together.

The filter media can be modified according to the application in question.

By coating the free grain surface inside the filter medium with activated aluminum oxide to the extent that the activated aluminum oxide represents 3–40 wt. % of the whole filter medium, a BET surface area of at least 50 $m^2/g$ can be achieved.

To this end the filter medium is usefully coated with a suspension of activated alumina, preferably α-alumina as raw material, and with a small amount of binder, and then activated. A process which may be employed for this is described in the U.S. Pat. No. 4,287,098.

The filter medium can also be coated with carbon to the extent that the amount of carbon present can represent 3-40 wt. % of the whole filter medium. Under carbon one can understand here also coke, pitch and graphite.

A further possibility for improving the wetting and equalizing the conduction of the liquid metal through the filter is to coat the free grain surface of the filter medium, alone or in addition to other treatments, with 0.5-20 wt. %—with respect to the total weight of the filter medium—of a fluxing agent for metals.

Salts such as chlorides or fluorides act as metal fluxes. For example $Na_3AlF_6$, NaCl, KCl, $CaF_2$, $AlCl_3$, LiF, NaF, KF or mixtures thereof are employed with aluminum.

The filter can also be made up of at least three layers, with the middle layer containing for example loose or bonded fluoride-bearing compounds.

The layer can be made up of fine, particulate $AlF_3$ material or be wholly or partly of alkali fluo-aluminates which are solid at the temperature of the molten metal. When the aim is the mainly removal lithium, magnesium and calcium, the loose material can be a bed of reactive particles of cryolite or a lithium-free electrolyte having a low $NaF:AlF_3$ ratio i.e. containing $AlF_3$ in excess to the stoichiometric amount required for $Na_3AlF_6$, this under the provision that the greater part of the material remains solid at the treatment temperature. This is normally the case, if the above mentioned ratio is maintained in the range 1:3 to 1:5. The active fluoride salts can contain an amount of inert material such as aluminum oxide.

A further advantageous version is such that ceramic fibers—0.1 to 10 wt. % with respect to the refractory material—are present in the refractory material or on the surface of the grains, and such that at least one end of the ceramic fibers projects out beyond the surface of the grains.

Ceramic fibers which come into consideration are those of aluminum oxides, aluminum silicates, zirconium oxides, boron, silicon carbide or carbon. Lying within the scope of the present invention are also all naturally occurring mineral fibers.

The grains are mixed in size fractions, together with inorganic binder if included and a substance which bakes on heating, this to obtain adequate green strength. The chemical or ceramic binder and baking agent are preferably mixed together first, and then the refractory material mixed into this.

Baking agents which can be considered here are organic compounds such as carboxy methylcellulose, polyvinyl alcohols, dextrine, sulphite liquor etc. and inorganic compounds such as mono-aluminum phosphate, calcium aluminate, $SiO_2$ sol and sodium silicate (water glass), alone or mixtures thereof. As a rule the baking agent is employed in the form of an aqueous solution.

The purpose of the baking agent is to hold the individual particles together at the start and to enable the mix to be shaped and held together as such until the final baking takes place. As a rule the mix, if necessary the binder, and the baking agent are mixed with water in a conventional manner by stirring or kneading.

The shaping of the mixed mass can take place by various methods such as ramming, shaking or casting in a mold, unaxial or isostatic pressing or by extrusion. Drying is carried out at 80°-100° C. depending on the type and composition of the baking agent, and produces good green strength at most after 24 hours.

If Na silicate or sulphite liquor is employed as binder and a conventional treatment with $CO_2$ carried out then the drying can be eliminated.

The filter medium is made up layer by layer, the new layer being deposited before or after drying, also after baking if desired.

In order to have a high degree of control over the porosity a possible method of manufacture can be employed wherein the refractory material in layer A preferably contains an amount of combustible granulate or grains. For this one can employ for example powdered cork or polystyrene. During the baking process the combustible material disappears leaving behind a body with a correspondingly higher degree of porosity and larger pore diameter.

The baking of the ceramic material takes place in a gas-fired or electric furnace at temperatures which depend on the type of bond to be produced and as a function of the composition of the refractory material.

The baking agent volatilizes or burns off at the latest during the high temperature baking process and does so largely without leaving residue behind.

Already at the green compact stage the structure of the filter medium according to the invention is that of an almost dense packing of spheres. This makes it possible to minimize the shrinkage due to settling and diffusion processes normally experienced when sintering refractory materials.

The filter media according to the invention are employed for filtering molten aluminum.

Filtration of molten copper, copper alloys, grey cast iron, titanium etc. is also possible.

The filter media according to the invention are also suitable for the so-called rheo-casting process.

The choice of refractory material and inorganic binder must take into account the melting point of and filtration temperature for the metal in question.

Filter elements can be prepared in almost any desired shape and size. Furthermore, if hollow sphere granules are employed a relatively low specific weight is achieved so that even large filter elements are self-supporting and resistant to temperature changes. A preferred mode of application is such that the filter medium is given the shape of a plate or slab with inclined sloping edges. Such a plate or slab can be employed for example in place of a filter plate such as is described in the U.S. Pat. No. 3,893,917.

As well as filter plates, filter pipes, filter candles, filter crucibles and filter blocks are easy to manufacture, install and use in appropriate filter troughs. In contrast to the filters which are known to date it is possible to endow the filter media according to the invention with a structured surface.

The structure of the various layers in the filter media according to the invention ensures that the molten metal to be filtered is uniformly distributed in the filter and that the inner surface is wet uniformly and completely. As a result the whole of the filter has an effective filtering action, which produces high through flow rates; also the complete wetting of the inner surface produces good filtration.

It is likewise possible to provide on known kinds of filter—such as ceramic foam filters as in the U.S. Pat. No. 3,893,917 or "Rigid Filter Medias" in U.S. Pat. No. 3,524,548—a layer in accordance with the invention having the values $d_B$, $f_B$ and $\lambda_B$ where $d_B$, $f_B$ and $\lambda_B$ have the explained meaning. The layer is preferably, as viewed in the direction of metal flow, provided on the lower side or rear of the original filter element i.e. after the original filter element. This additional layer is likewise able to improve considerably the wetting of known types of filter elements.

EXAMPLE No. 1 (COMPARISON)

50 kg of hollow spherical corundum, particle size 0.5-1 mm, was mixed intensively with a 10 kg mix of a glazing mixture and 7 l carboxymethyl-cellulose solution to give mixture No. 1. The glazing mixture contains 30% $SiO_2$, 30% potassium feldspar, 15% calcium carbonate, 5% calcium silicate, 17% kaolin and 2.5% alumina with a particle size less than 60 microns. The mixture of hollow spherical corundum, glazing mix and carboxymethyl-cellulose is of a dry consistency. A part of this mixture was transferred by shaking into metal frames measuring 30×30×5 cm in size and having sloping walls; the surface of this mass was then smoothed with a metal roller. The metal frames together with the ceramic mix contents were then placed in an electric drying oven where the mass was dried for 24 h at 80° to 100° C. After drying the ceramic contents were removed as a block which was self-supporting and showed good strength at the edges. The crude filter was then placed in an electric furnace where it was baked up to a maximum temperature of 1280° C. The holding time was 10 min, heating up and cooling down rate approximately 100° C. per hour. The linear shrinkage was 0%.

The baked filter exhibited the following features:

| Color | white |
| --- | --- |
| Volume | 4.3 l |
| Weight | 3.0 kg |
| Weight per unit volume | 0.7 kg/l |
| Permeability, measured acc. to DIN 51058 | 14–16 microperm |
| Bend strength via 3 point bend test, measured on 15 test pieces (25 × 25 × 100 mm) bearing radius 14 mm, bearings 50 mm apart. | 230 ± 50 N/cm$^2$ |
| Cold compression strength | 410 ± 50 N/cm$^2$ |
| Edge strength | good |

A filter manufactured in the way described was placed in a prepared filter trough, as described in the U.S. Pat. No. 3,893,917, and pre-heated to a temperature of about 700° C. An aluminum alloy, code number 5182 (metal temperature 700° C.) was then fed through the filter at a rate of 100 kg/min. The metal feed level (level at which the metal first flows through the filter plate) was 570 mm. The operating level (difference in level of metal before and after the filter box during production) was 400 mm at the start of casting, and about 450 mm after 60 min.

Metal quality was assessed on samples taken at the same time upstream and downstream of the filter; these samples were prepared by diamond polishing and etching, then the number of inclusions present recorded. The results of this inspection showed an approximatele 80% reduction in the number of inclusions in the metal downstream of the filter.

EXAMPLE No. 2

50 kg of hollow spherical corundum of particle size 1-2 mm was, as described in the first example, mixed with a mix of glazing mixture and carboxy-methyl-cellulose solution to give mixture No. 2. A part of mixture No. 1, the production of which is described in the first example, was then placed in a metal frame—measuring 30×30 cm and having sloping sides—to a depth of about four layers of particles i.e. 2 mm; this layer was then packed down by rolling with a metal roller.

A part of mixture 2 was then placed directly on top of that first layer; this was then smoothed and packed down to a depth of 5 cm by rolling. The further processing steps, e.g. drying, removal from the mold and baking, were carried out as described in the first example. The filter was then inserted in a filter box under the same conditions as described in the first example. Molten aluminum alloy 5182 at 700° C. was then fed through the filter at 6 t/h.

Operation conditions were:

| Feed level | 380 mm |
| --- | --- |
| Operating level | 90 mm |
| Cleaning efficiency | 95% |

This example shows that the cleaning efficiency was improved under improved operating conditions.

Figure 2:
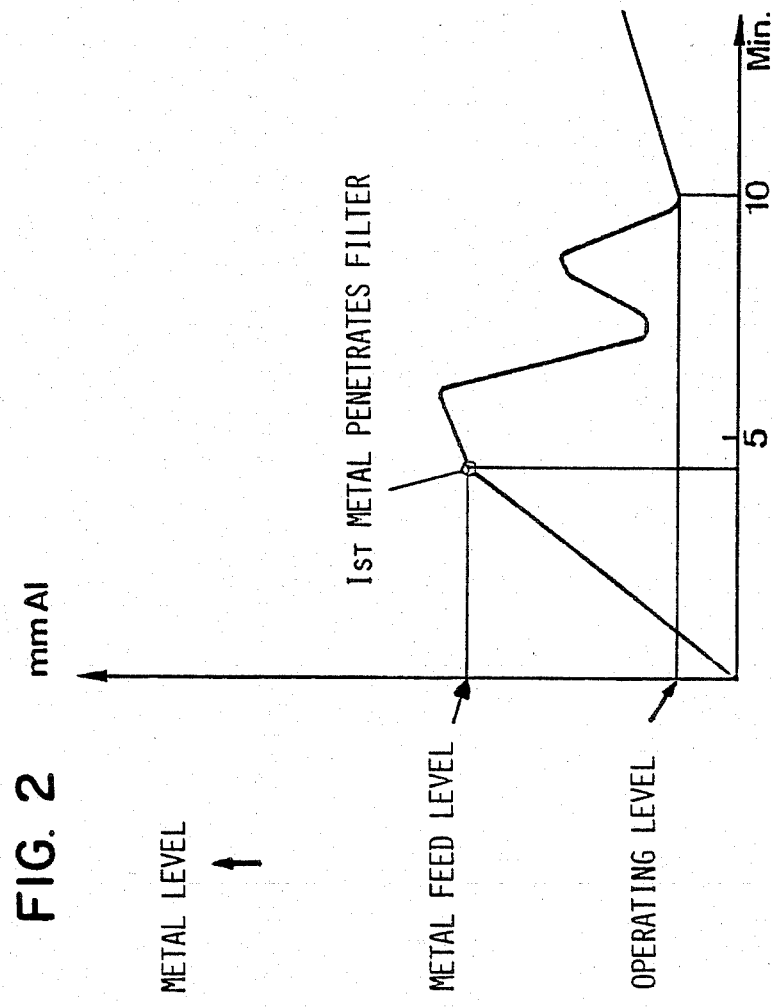
FIG. 2 is a graph illustrating the change in metal level as a function of time for Example No. 2.

FIG. 1 shows the change in metal level as a function of time for Example No. 1. FIG. 2 shows the change in metal level as a function of time for Example No. 2 and shows that with the filter with 2 layers differing in degree of fineness there are two peaks in the metal level during start-up and this at an overall lower metal feed level. The resultant operating level is, for the same metal throughput as in example No. 1, likewise lower as a result of the more complete filling of the filter.

EXAMPLE No. 3

50 kg of hollow spherical corundum of particle size 3–5 mm was mixed as indicated in examples 1 and 2; one part of this mixture was placed and compacted to a depth of 50 mm in a metal mold (584×584 mm) on top of an approximately 4 particle thick bed of 1-2 mm particulate filter material mixed as described above. Further processing is as described in example No. 1. The permeability of the resultant filter (a) was measured in accordance with DIN 51058 (Determination of specific gas permeability of refractory bricks) at a compressed air pressure of 20 Nm$^3$/h whereupon a pressure drop of, at most, 3.20 mbar was registered when measuring in the direction of metal flow from the fine to the course grained layer, and 1.30 mbar when measuring in the opposite direction (surface area measured 33 cm$^2$). The aluminum alloy Peraluman 100 was fed to the filter at 24 t/h at a temperature of 710° C. The operating data for this filter compared with that for another filter (b) of the same size but with a particulate size of 2-3 mm throughout were as follows:

| Filter | (a) | (b) |
| --- | --- | --- |
| No. of filter layers | 2 | 1 |
| Metal feed level | 135 mm | 180 mm |
| Operating level | 50 mm | 80 mm |

Filter (b) of 2-3 mm particulate material had to be broken after a few minutes as the metal feed rate of 24 t/h exceeded the capacity of the filter.

Metal samples taken upstream and downstream of filter (a) were prepared as described earlier and examined for inclusions; the results showed an average reduction of 90% in the number of inclusions achieved by filter (a).

Measurement of the degree penetration of the filter volume through which melt can pass (stereometric measurement of sectioned filters) gave a value of 87% for filter (a) and 69% for filter (b).

What is claimed is:

1. A filter medium in the form of a stable body of ceramic material for filtering molten metal comprising at least a first filtering layer A and a second filtering layer B arranged one after the other in the direction of filtration, said at least first filtering layer A having a thickness $d_A$ of between 9–91 mm, porosity $f_A$ of between 0.25–0.8 and pore diameter $\lambda_A$ of between 0.5–2 mm wherein the parameter $H_{SA}$ of layer A which is proportional to the filtering resistance of layer A is equal to $$\frac{d_A}{\lambda_A^2 f_A}$$

and has values of between 28–14,560 cm$^{-1}$, said at least second filtering layer B having a thickness $d_B$ of between 1–33 mm, porosity $f_B$ of between 0.25–0.5 and pore diameter $\lambda_B$ of between 0.2–1 mm wherein the parameter $H_{SB}$ of layer B which is proportional to the filtering resistance of layer B is equal to $$\frac{d_B}{\lambda_B^2 f_B}$$

and has values of between 20–33,000 cm$^{-1}$, and wherein the ratio of thickness $d_A$ to thickness $d_B$ lies between 9:1 and 3:1, and the ratio of the numerical values of parameters $H_{SA}$ and $H_{SB}$ lies between 1:1.2 and 1:30.

2. A filter medium according to claim 1 wherein said first filtering layer A is positioned upstream of said second filtering layer B.

3. A filter medium according to claim 1 wherein said first filtering layer A and said second filtering layer B are made up of refractory material in the form of spherical grains bonded together.

4. A filter medium according to claim 3 wherein said spherical grains are hollow.

5. A filter medium according to claim 4 wherein said refractory material comprises hollow, spherical grains of corundum.

6. A filter medium according to claim 5 wherein said hollow corundum grains are employed with close control on grain size distribution such that the minimum grain diameter in a range of particle sizes is greater than 65% of the size of the maximum particle size.

7. A filter medium according to claim 3 wherein said grains are strongly bonded together with a glassy type binder, the amount of binder accounting for 20–40 wt. % of the final filter medium.

8. A filter medium according to claim 3 wherein said grains are bonded strongly together by a crystalline substance.

9. A filter medium according to claim 1 wherein the filter medium is built up of three layers wherein at least one of the layers contains a fluoride bearing compound.

* * * * *

UNITED STATES PATENT AND TRADEMARK OFFICE
CERTIFICATE OF CORRECTION

PATENT NO. : 4,528,099
DATED      : July 9, 1985
INVENTOR(S): Wolfhart Rieger et al.

It is certified that error appears in the above-identified patent and that said Letters Patent are hereby corrected as shown below:

On the Cover Page, under the heading "Inventors" please make the following changes:

Change "Lugwig Gauckler" to read --Ludwig Gauckler--; and

Change "Albert Mauer" to read --Albert Maurer--.

Signed and Sealed this

Twelfth Day of November 1985

[SEAL]

Attest:

DONALD J. QUIGG

Attesting Officer

Commissioner of Patents and Trademarks